United States Patent
Shigematsu et al.

(10) Patent No.: US 9,212,714 B2
(45) Date of Patent: Dec. 15, 2015

(54) FIBER REINFORCED PLASTIC SPRING

(75) Inventors: Ryohei Shigematsu, Yokohama (JP); Miho Nakazono, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/002,215

(22) PCT Filed: Feb. 27, 2012

(86) PCT No.: PCT/JP2012/055486
§ 371 (c)(1),
(2), (4) Date: Aug. 29, 2013

(87) PCT Pub. No.: WO2012/121181
PCT Pub. Date: Sep. 13, 2012

(65) Prior Publication Data
US 2014/0001688 A1    Jan. 2, 2014

(30) Foreign Application Priority Data

Mar. 10, 2011  (JP) .................................. 2011-052816

(51) Int. Cl.
*F16F 1/368*    (2006.01)

(52) U.S. Cl.
CPC ..................... *F16F 1/368* (2013.01)

(58) Field of Classification Search
CPC .............. F16F 1/368; F16F 2224/0241; F16F 2238/002
USPC ........... 267/36.1, 47, 158, 159, 160, 148, 149
See application file for complete search history.

(56) References Cited

U.S. PATENT DOCUMENTS 3,682,466 A * 8/1972 Huchette et al. ............... 267/149
3,968,958 A * 7/1976 Huchette et al. ............... 267/149

(Continued)

FOREIGN PATENT DOCUMENTS

EP    0 082 321 A2    6/1983
GB       1333558 A  * 10/1973

(Continued)

OTHER PUBLICATIONS

Extended European Search Report issued in European Patent Application No. 12754600.0 on Aug. 20, 2014.

(Continued)

*Primary Examiner* — Thomas J Williams
(74) *Attorney, Agent, or Firm* — Oliff PLC

(57) ABSTRACT

A fiber reinforced plastic spring is provided, in which broken pieces can be prevented from being scattered when breaking without using any additional member and variation in load when breaking can be reduced. FRP spring has a layered structure having basic unit consisting of a positive direction orientating layer and a negative direction orientating layer 22. By appropriately setting an absolute value of orientating angles of each layer, fibers in the positive direction orientating layer and the negative direction orientating layer can be entangled mutually, and thus, the spring as a whole exhibits pseudo-ductility in a breakage condition. Elastic modulus and strength available for use as a spring can be obtained and breaking at a resin portion between fibers can be prevented in each layer.

3 Claims, 4 Drawing Sheets

(56) References Cited

U.S. PATENT DOCUMENTS

| | | | | |
|---|---|---|---|---|
| 4,601,367 | A | * | 7/1986 | Bongers ............ 267/149 |
| 5,685,525 | A | | 11/1997 | Oguri et al. |
| 8,857,801 | B2 | * | 10/2014 | Yoshioka ............ 267/149 |
| 2008/0284069 | A1 | | 11/2008 | Aulich et al. |

FOREIGN PATENT DOCUMENTS

| | | |
|---|---|---|
| GB | 2 211 913 A | 7/1989 |
| JP | A-57-90433 | 6/1982 |
| JP | A-57-110838 | 7/1982 |
| JP | A-58-21034 | 2/1983 |
| JP | S61-149631 A | 7/1986 |
| JP | A-63-225738 | 9/1988 |
| JP | A-2003-20542 | 1/2003 |
| JP | A-2005-47387 | 2/2005 |
| JP | A-2007-170520 | 7/2007 |
| JP | A-2009-515122 | 4/2009 |

OTHER PUBLICATIONS

Jun. 5, 2012 International Search Report issued in International Patent Application No. PCT/JP2012/055486.
"FRP Structure Setting Handbook." Reinforced Plastic Organization, p. 4, 1994.
"Fiber-reinforced plastics—Methods of producing test plates." Japanese Industrial Standard, vol. K 7016-1, p. 5, 2009.
Oct. 8, 2014 Office Action issued in Chinese Application No. 201280012544.9.
"Mechanics of Composite Materials Introduction to Engineering Beginners," Sep. 7, 2009, p. 87.
Shimamura, Y. et al., "Inexpensive FEM Analysis of Delamination Process in Composite Laminates by Using Two-Dimensional Elements," Aug. 1998, pp. 28-33, vol. 64, No. 624 (with Abstract and partial translation).
Japanese Office Action issued in Japanese Patent Application No. 2011-052816 on Aug. 20, 2014 (with translation).

* cited by examiner

FIBER REINFORCED PLASTIC SPRING

TECHNICAL FIELD

The present invention relates to a fiber reinforced plastic spring, and in particular, relates to a technique to control breakage conditions when a load is applied thereto.

BACKGROUND ART

In the field of vehicles, for example, a pulsating spring to which a bending load is applied (such as a spiral spring, a flat spiral spring, or a plate spring) is used, and it has been necessary to reduce the weight and size of the spring. For example, in order to reduce weight, it has been suggested that a fiber reinforced plastic spring (hereinafter referred to as an FRP spring) be used instead of a metallic spring.

For example, as shown in FIG. 8, in the case in which a pulsating bending load P is applied to a plate spring 51 which is supported by supporting portions 52, compressive stress is generated at an upper surface portion of a loaded side, and tensile stress is generated at a lower surface portion which is at the opposite side of the loaded side. It should be noted that reference symbol S is the neutral axis positioning at a center of thickness direction of the plate spring 51. In the case in which the FRP spring is used as the plate spring 51, cracking may occur at the compressive stress side.

In the FRP plate spring, simply the generation of small cracks may easily result in the spring breaking. In this case, as shown in FIG. 7, it may be broken, exhibiting brittleness. Therefore, there are a risk of scattering of broken pieces and a risk of damaging circumferential parts by the scattered broken pieces. In addition, since variation of load is large when there is breaking, ride comfort of vehicle may be badly affected.

In order to avoid scattering of broken pieces during breaking, a technique is disclosed in which a circumference of an end part of an energy absorbing member made of fiber reinforced resin is covered by a hollow cover (See Japanese Unexamined Patent Application Publication No. 2005-47387).

However, this technique is difficult to apply to a plate spring, and in addition, the hollow cover should be prepared as an additional member. Furthermore, it is difficult for this technique to reduce variation of load during breaking.

SUMMARY OF THE INVENTION

Therefore, an object of the present invention is to provide a fiber reinforced plastic spring in which scattering of broken pieces during breaking can be prevented by the spring alone, without using another member, and in which variation in load during breaking can be reduced.

A feature of the fiber reinforced plastic spring of the present invention (hereinafter referred to as an FRP spring) is that the spring has a positive direction orientating unit having at least one positive direction orientating layer and a negative direction orientating unit having at least one negative direction orientating layer, the spring has a layered structure in which the positive direction orientating unit and the negative direction orientating unit are alternately layered, fiber is orientated at an orientating angle of the positive direction against longitudinal direction in the positive direction orientating layer, and fiber is orientated at an orientating angle of the negative direction against the longitudinal direction in the negative direction orientating layer.

In the FRP spring of the present invention, in the case in which a large bending load is applied, for example, there may be a case in which brittle breaking occurs at each of the positive direction orientating layer and the negative direction orientating layer of the layered structure. Here, in the layered structure, the positive direction orientating unit having at least one positive direction orientating layer and the negative direction orientating unit having at least one negative direction orientating layer are alternately layered. In this case, since the orientating direction of the positive direction orientating layer of the positive direction orientating unit is the positive direction against the longitudinal direction and the orientating direction of the negative direction orientating layer of the negative direction orientating unit is the negative direction against the longitudinal direction, orientating direction of the fiber in the positive direction orientating unit and orientating direction the fiber in the negative direction orientating unit are mutually intersecting.

Therefore, by appropriately setting the absolute value of the orientating angle of the positive direction orientating layer and the negative direction orientating layer, the fiber of the positive direction orientating unit and the fiber of the negative direction orientating unit can become entangled during breaking. In this way, in the case in which a pulsating bending load is applied to the FRP plate spring of one example of the present invention, for example, under the condition of breaking of the entire spring, it is pseudo-ductile, not brittle, as shown in FIG. 6. Therefore, the entire spring can break incrementally. In addition, by appropriately setting an absolute value of the positive direction orientating layer and the negative direction orientating layer, elastic modulus and strength available for use as a spring can be obtained, and at the same time, breaking at a resin between fibers can be prevented in each layer. As a result, broken pieces can be prevented from being scattered when breaking without using any additional member. Furthermore, since variation of load during breaking can be reduced, ride comfort of vehicle can be maintained.

Several structures can be employed in the FRP spring of the present invention. For example, in one aspect, an absolute value of an orientating angle of the positive direction orientating layer and the negative direction orientating layer can be set to within 20 to 30 degrees. In this aspect, since the absolute value of the orientating angle is set to not less than 20 degrees, the fibers of the positive direction orientating unit and the fibers of the negative direction orientating unit can be sufficiently entangled when breaking. On the other hand, since the absolute value of the orientating angle is set to not more than 30 degrees, elastic modulus and strength available for use as a spring can be obtained, at the same time, breaking at a resin between fibers can be prevented in each layer.

In addition, an aspect in which the positive direction orientating unit has one positive direction orientating layer, the negative direction orientating unit has one negative direction orientating layer, and the positive direction orientating layer and the negative direction orientating layer are alternately layered, can be employed. In this aspect, since all the positive direction orientating layer is adjacent to the negative direction orientating layer, all of the layers of the layered structure can be entangled sufficiently.

By the FRP spring of the present invention, the following effects can be achieved. That is, not only can the elastic modulus and strength available for use as the spring be obtained, but broken pieces can also be prevented from being scattered during breaking by the spring alone, without using any additional member, and in addition, variation of load during breaking can be reduced.

BRIEF EXPLANATION OF DRAWINGS

FIG. 1 shows a structure of the fiber reinforced plastic spring according to one embodiment of the present invention.

FIG. 2 shows a structure of a part of the fiber reinforced plastic spring according to one embodiment of the present invention.

EXPLANATION OF REFERENCE NUMERALS

1 . . . FRP spring (fiber reinforced plastic spring), 20 . . . layered structure, 20A . . . basic unit, 21 . . . positive direction orientating layer, 22 . . . negative direction orientating layer, $\theta 1, \theta 2$ . . . orientating angle, S1, S2 . . . orientating direction.

BEST MODE FOR CARRYING OUT THE INVENTION

Figure 1A:
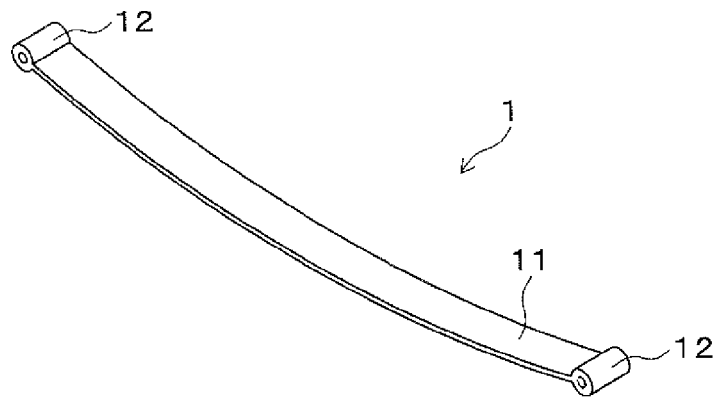
FIG. 1A is an oblique view.
Figure 1B:
FIG. 1B is a side view.
Figure 2A:
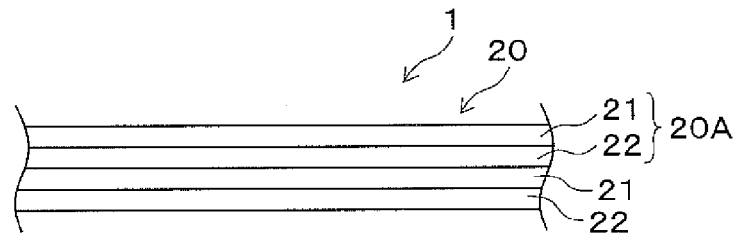
FIG. 2A is a side cross-sectional view.
Figure 2B:
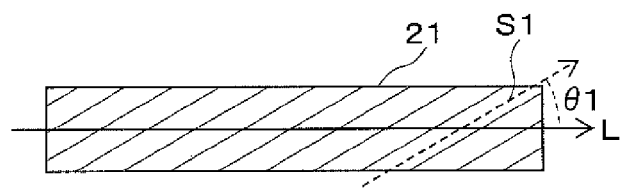
FIG. 2B is a cross-sectional view of the positive direction orientating layer.
Figure 2C:
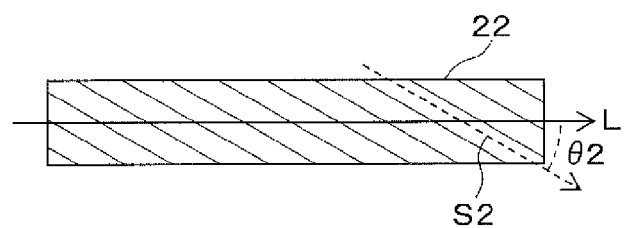
FIG. 2C is a cross-sectional view of the negative direction orientating layer.

Hereinafter, embodiments of the present invention are explained with reference to the drawings. FIG. 1 shows a structure of the fiber reinforced plastic spring (hereinafter referred to as an FRP spring) according to one embodiment of the present invention; FIG. 1A is an oblique view, and FIG. 1B is a side view. FIG. 2 shows a structure of a part of the FRP spring 1; FIG. 2A is a side cross-sectional view, FIG. 2B is a cross-sectional view of the positive direction orientating layer, and FIG. 2C is a cross-sectional view of the negative direction orientating layer.

The FRP spring 1 is a plate spring having a leaf portion 11 and eye portions 12 for example. The FRP spring 1 has a layered structure 20 in which a positive direction orientating layer 21 and a negative direction orientating layer 22 are alternately layered, for example. The positive direction orientating layer 21 and the negative direction orientating layer 22 are a unidirectional (UD) fibrous layer in which fibers are orientated within a surface parallel to the layered surface, for example. Reference S1 shown in FIG. 2B shows an orientating direction of fibers of the positive direction orientating layer 21, and it is desirable that the orientating angle $\theta 1$ is set within a range of 20 to 30 degrees against the longitudinal direction L. Reference S2 shown in FIG. 2C shows an orientating direction of fibers of the negative direction orientating layer 22, and it is desirable that the orientating angle $\theta 2$ be set within a range of −20 to −30 degrees against the longitudinal direction L. It should be noted that absolute values of the orientating angle $\theta 1$ and $\theta 2$ can be the same or different, as long as they are more than 0 degrees. In the case in which multiple positive direction orientating layers 21 are arranged, orientating angles $\theta 1$ of each of the positive direction orientating layers 21 can be the same or different. The orientating angle $\theta 2$ of the negative direction orientating layer 22 can be selected similarly.

If a portion consisting of the positive direction orientating layer 21 and the negative direction orientating layer 22 is defined as a basic unit 20A, two basic units 20A are arranged in the layered structure of FIG. 2. However, the present invention is not limited to this structure, and the present invention has at least one basic unit 20A. Furthermore, in the embodiment shown in FIG. 2, one positive direction orientating layer 21 is arranged in the positive direction orientating unit of the present invention and one negative direction orientating layer 22 is arranged in the negative direction orientating unit; however, the present invention is not limited to this. For example, a positive direction orientating unit consisting of multiple positive direction orientating layers 21 having mutually different orientating angles $\theta 1$ and a negative direction orientating unit consisting of multiple negative direction orientating layers 22 having mutually different orientating angles $\theta 2$, can be alternately layered.

Furthermore, in the embodiment shown in FIG. 2, the FRP spring 1 is formed by only the layered structure 20 consisting of the basic unit 20A; however, the layered structure 20 can occupy a part of a thickness direction of FRP spring 1. For example, a UD fibrous layer in which fibers are orientated to a certain direction, a cross fibrous layer in which fibers are intersecting at a certain angle, or the like, can be arranged on an upper or lower surface of the layered structure 20. The abovementioned variations can be employed in combination according to the properties that are required.

As each layer 21 and 22 of the layered structure 20, a prepreg in which fibers orientating in a certain angle are immersed in a resin, can be employed. As the resin, those of the thermosetting or thermoplastic type can be used. Furthermore, each layer of the layered structure 20 can be formed by a filament winding method. In this case, by controlling winding direction of fibers against a mold for forming (mandrel), a UD fiber orientating at a certain angle can be obtained. As a fiber forming each layer 21 and 22 of the layered structure, for example, a reinforced fiber such as carbon fiber, glass fiber, aramid fiber (Kevlar fiber), boron fiber can be used. As the carbon fiber, for example, PAN type or pitch type can be used.

In this Embodiment, in the case in which large pulsating bending load is applied, for example, brittle breaking may occur at each of the positive direction orientating layer 21 and the negative direction orientating layer 22 of the layered structure 20. Here, in the layered structure 20, since orientating direction of the positive direction orientating layer 21 is in the positive direction against the longitudinal direction L and orientating direction of the negative direction orientating layer 22 is in the negative direction against the longitudinal direction L, the orientating direction S1 of the positive direction orientating layer 21 and the orientating direction S2 of the negative direction orientating layer 22 mutually adjacent are intersecting.

Therefore, by appropriately setting the absolute values of orientating angle $\theta 1$ of the positive direction orientating layer 21 and orientating angle $\theta 2$ of the negative direction orientating layer 22 of the basic unit 20A, fibers in the positive direction orientating layer 21 and fibers in the negative direction orientating layer 22 can be entangled when breaking. By this, in the case in which pulsating bending load is applied to the FRP plate spring 1, the condition when the entire spring breaks is one that is pseudo-ductile, not brittle. Therefore, the entire spring can be broken incrementally. In addition, by appropriately setting absolute values of orientating angles θ1 and θ2, elastic modulus and strength available for use as a spring can be obtained, at the same time, breaking at a resin between fibers can be prevented in each layer 21 and 22. As a result, broken pieces can be prevented from being scattered when breaking without using any additional member. Furthermore, since variation of load during breaking can be reduced, ride comfort of a vehicle can be maintained. Since such effects can be obtained by a single spring, the present invention can be applied to a plate spring like the FRP spring 1.

In particular, since absolute values of the orientating angles θ1 and θ2 are set not less than 20 degrees, fibers in the positive direction orientating layer 21 and fibers in the negative direction orientating layer 22 can be sufficiently entangled with each other when breaking. On the other hand, as the absolute values of the orientating angles θ1 and θ2 increase, the strength of each layer 21 and 22 is decreased. However, absolute values of the orientating angles θ1 and θ2 are set to not more than 30 degrees, elastic modulus and strength available for use as a spring can be obtained sufficiently, and at the same time, breaking at a resin between fibers can be prevented in each layer effectively. Furthermore, since the positive direction orientating layer 21 and the negative direction orientating layer 22 are alternately layered, all of the layers 21 and 22 of the layered structure 20 can be sufficiently entangled when breaking.

EXAMPLES

Hereinafter embodiments of the present invention are explained further in detail by way of practical examples. In the Examples, multiple FRP plate springs having mutually different orientating angles of the positive direction orientating layer and the negative direction orientating layer were prepared, and three-point bending tests was performed thereon.

An FRP plate spring of Comparative Example 11 was prepared by multiply layering basic units, each consisting of positive direction orientating layer (orientating angle 0 degrees) and negative direction orientating layer (orientating angle 0 degrees). FRP plate spring of Example 11 (absolute value of orientating angle 5 degrees) was prepared by multiply layering basic units each consisting of positive direction orientating layer (orientating angle 5 degrees) and negative direction orientating layer (orientating angle −5 degrees). FRP plate spring of Example 12 (absolute value of orientating angle 13 degrees) was prepared by multiply layering basic units each consisting of positive direction orientating layer (orientating angle 13 degrees) and negative direction orientating layer (orientating angle −13 degrees). FRP plate spring of Example 13 (absolute value of orientating angle 20 degrees) was prepared by multiply layering basic units each consisting of positive direction orientating layer (orientating angle 20 degrees) and negative direction orientating layer (orientating angle −20 degrees). FRP plate spring of Example 14 (absolute value of orientating angle 30 degrees) was prepared by multiply layering basic units each consisting of positive direction orientating layer (orientating angle 30 degrees) and negative direction orientating layer (orientating angle −30 degrees).

Figure 3:
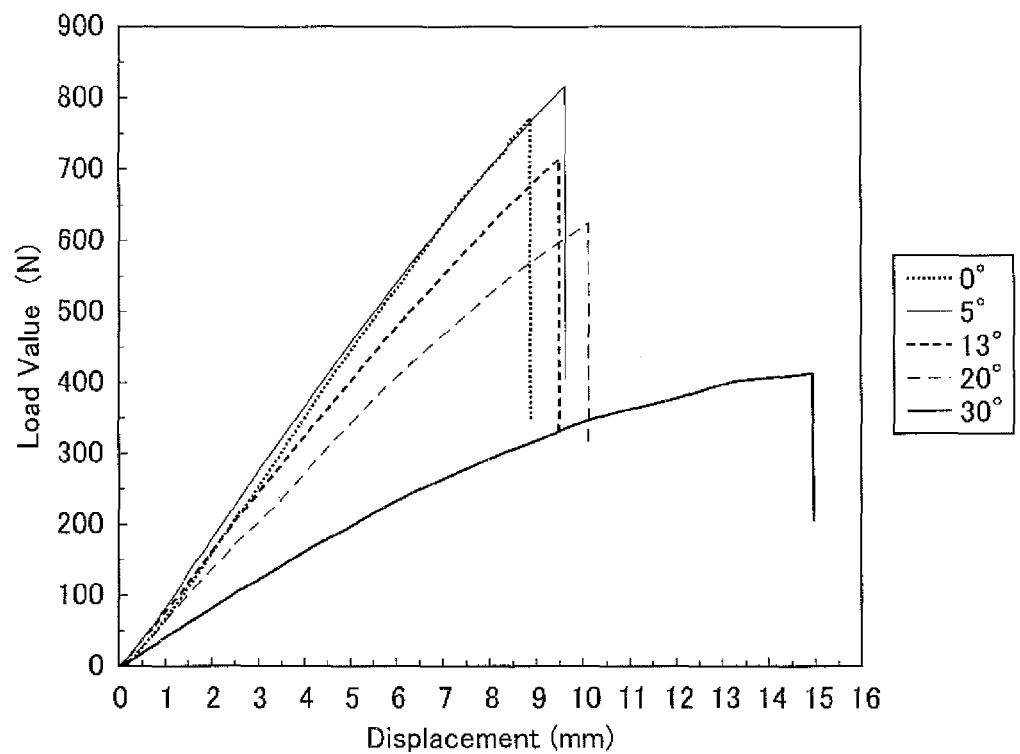
FIG. 3 is a graph showing an experimental result of a three-point bending test.
Figure 4:
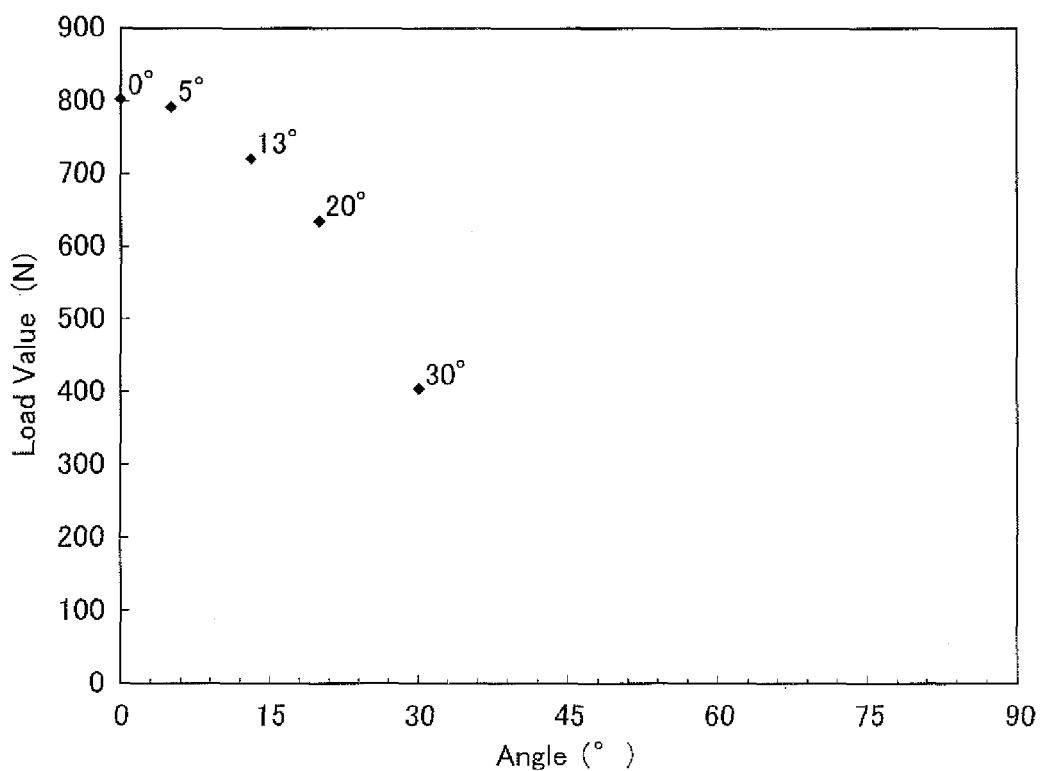
FIG. 4 is a graph showing the relationship of orientating angle and breaking load value obtained in the experiment of the three-point bending test.
Figure 5:
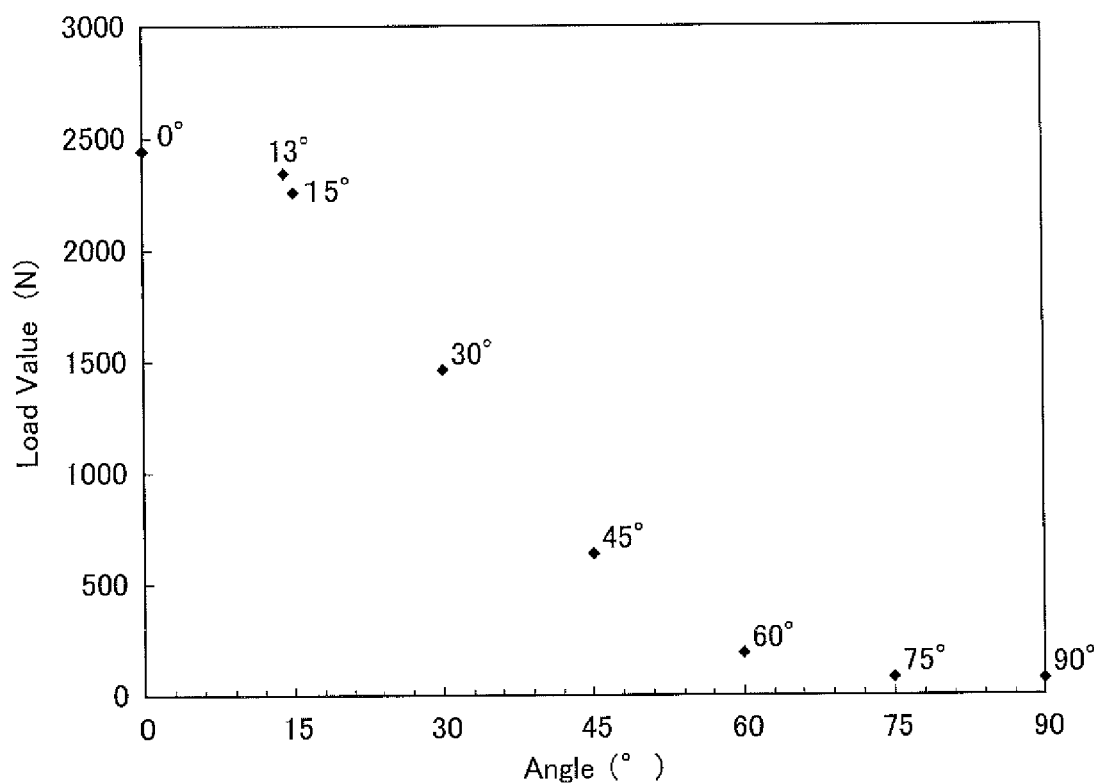
FIG. 5 is a graph showing the relationship of orientating angle and breaking load value obtained in the simulation of the three-point bending test.
Figure 6:
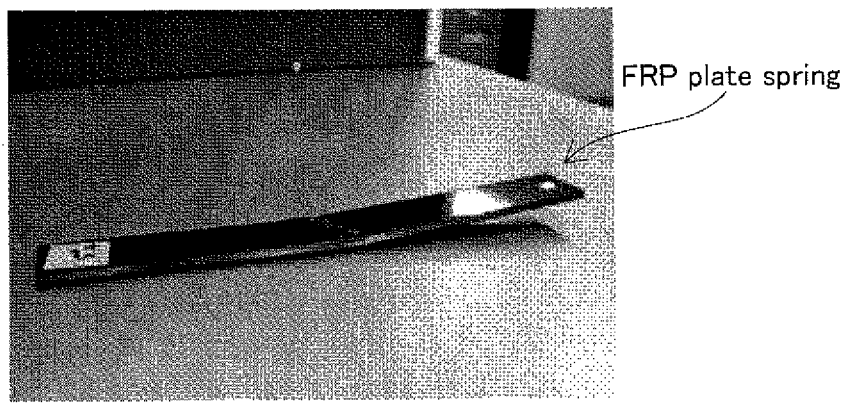
FIG. 6 is a photograph showing a breakage condition of an FRP plate spring, which is one example of the preset invention when a load has been applied thereto.
Figure 7:
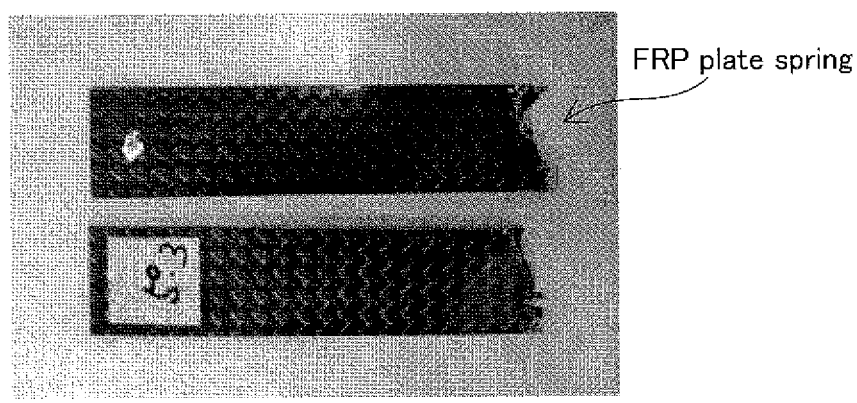
FIG. 7 is a photograph showing a breakage condition of a conventional FRP plate spring when a load has been applied thereto.
Figure 8:
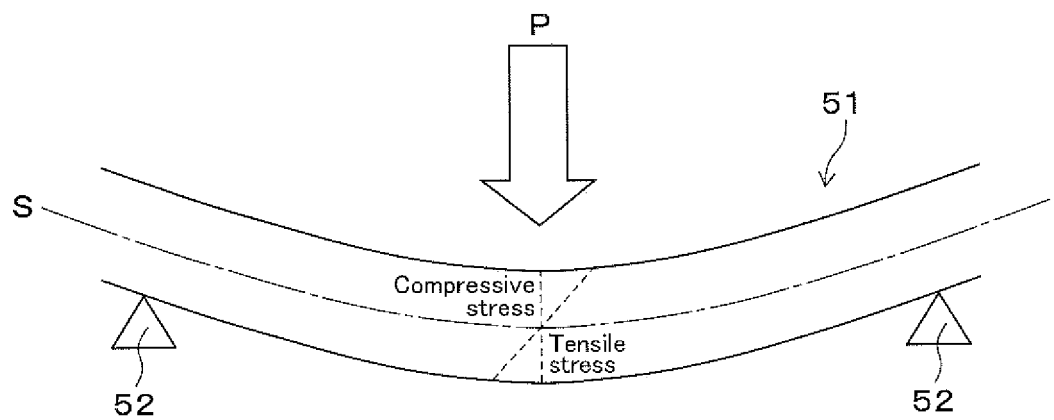
FIG. 8 is a diagram explaining stress distribution in the fiber reinforced plastic spring under a pulsating bending load.

In all of the Examples, the number of basic units layered was the same, a cross fiber having an intersecting angle of 45 degrees was arranged on upper and lower surfaces of the layered structure, and five springs were prepared. Table 1 shows conditions of samples and results of the three-point bending tests. FIG. 3 shows a graph showing relationships of load and displacement, which is the result of the three-point bending tests. FIG. 4 is a graph showing relationships of orientating angle and breaking load value obtained in the experiments of the three-point bending tests. FIG. 5 is a graph showing relationships of orientating angle and breaking load value obtained in the simulation of three-point bending tests. As the data shown in Table 1 and FIGS. 3 and 4, the average value among data of five plate springs is given for each Example. The results of simulations shown in FIG. 5 were obtained by setting the absolute values of orientating angle of the positive direction orientating layer and the negative direction orientating layer at 0, 13, 15, 30, 45, 60, 75, and 90 degrees. In Table 1 and FIGS. 3 to 5, absolute values of orientating angle are shown.

It was confirmed that load decreased as the absolute value of the orientating angle increased, as is obvious from FIG. 3, and breaking load decreased as the absolute value of the orientating angle increased, as is obvious from FIGS. 4 and 5. Furthermore, it was confirmed that bending elastic modulus decreased as the absolute value of the orientating angle increased, as is obvious from Table 1. For example, it was confirmed that the absolute value of the orientating angle is desirably set to not more than 30 degrees in order to obtain elastic modulus and strength available for use as a plate spring. It should be noted that magnitude of load value is different in the experimental result shown in FIG. 4 and simulation result shown in FIG. 5; however, this is because sizes of the plate springs used in the experiment and the simulation are mutually different. The experimental result shown in FIG. 4 and the simulation result shown in FIG. 5 both show similar tendency regarding variation of load as mentioned above, it was confirmed that stress which is a force per unit area is approximately the same in both cases.

Regarding breakage conditions of five plate springs in each Example in the three-point bending tests, as is obvious from Table 1, it was confirmed that a plate spring exhibiting pseudo-ductility can be formed by setting the absolute value of orientating angle to more that 0 degrees, and probability exhibiting pseudo-ductility is increased as the absolute value of orientating angle is increased. In particular, in the case in which the absolute value of the orientating angle is set to not less than 20 degrees, the probability exhibiting pseudo-ductility is not less than 80%, which is an extremely high probability.

TABLE 1

| Sample name Absolute value of orientating angle | Spring constant (N/mm) | Plate thickness (mm) | Breaking deflection (Displacement) (mm) | Breaking load (N) | Breaking bending stress (MPa) | Bending elastic modulus (N/mm$^2$) | Breakage condition (the number of springs) | | Ratio of pseudo-ductility |
|---|---|---|---|---|---|---|---|---|---|
| | | | | | | | Brittleness | Pseudo-ductility | |
| Comparative Example 11 0 degrees | 93.79 | 2.083 | 9.117 | 801.8 | 1560 | 83370 | 5 | 0 | 0% |

TABLE 1-continued

| Sample name Absolute value of orientating angle | Spring constant (N/mm) | Plate thickness (mm) | Breaking deflection (Displacement) (mm) | Breaking load (N) | Breaking bending stress (MPa) | Bending elastic modulus (N/mm²) | Breakage condition (the number of springs) | | Ratio of pseudo-ductility |
|---|---|---|---|---|---|---|---|---|---|
| | | | | | | | Brittleness | Pseudo-ductility | |
| Example 11 5 degrees | 95.75 | 2.077 | 9.032 | 792.0 | 1544 | 83592 | 4 | 1 | 20% |
| Example 12 13 degrees | 85.50 | 2.083 | 9.223 | 721.7 | 1402 | 73955 | 3 | 2 | 40% |
| Example 13 20 degrees | 68.63 | 2.082 | 10.497 | 635.5 | 1254 | 57270 | 1 | 4 | 80% |
| Example 14 30 degrees | 40.73 | 2.085 | 14.737 | 403.7 | 843 | 25797 | 0 | 5 | 100% |

As explained so far, it is clear that elastic modulus and strength available for use as a spring can be obtained by the layered structure in which the positive direction orientating layer and the negative direction orientating layer are adjacent, and that the spring as a whole exhibits pseudo-ductility. In particular, in order to efficiently obtain the above-mentioned effects by using a plate spring such as an FRP spring, it is clear to set the absolute value of the orientating angle within a range from 20 to 30 degrees. In addition, it is clear that it is desirable to alternately layer the positive direction orientating layer and the negative direction orientating layer.

The invention claimed is:

1. A fiber reinforced plastic spring comprising:
a positive direction orientating unit having at least one positive direction orientating layer and a negative direction orientating unit having at least one negative direction orientating layer, wherein
the plate spring has a layered structure in which the positive direction orientating unit and the negative direction orientating unit are alternately layered such that (i) a longitudinal direction of the positive orientating unit coincides with a longitudinal direction of the negative orientating unit, and (ii) the positive orientating unit and the negative orientating unit are in close contact with each other without clearance over an entire longitudinal length of the positive orientating unit and the negative orientating unit,
fiber is orientated at an orientating angle of positive direction against the longitudinal direction in the positive direction orientating layer,
fiber is orientated at an orientating angle of negative direction against the longitudinal direction in the negative direction orientating layer, and
an absolute value of the orientating angle of the positive direction orientating layer and an absolute value of the orientating angle of the negative direction orientating layer are set to between 20 and 30 degrees.

2. The fiber reinforced plastic spring according to claim 1, wherein the positive direction orientating unit has one positive direction orientating layer, the negative direction orientating unit has one negative direction orientating layer, and the positive direction orientating layer and the negative direction orientating layer are alternately layered.

3. The fiber reinforced plastic spring according to claim 1, wherein an absolute value of the orientating angle the positive direction orientating layer and an absolute value of the orientating angle of the negative direction orientating layer are set to less than 30 degrees and not less than 20 degrees.

* * * * *